US008799922B2

(12) United States Patent
Rajan et al.

(10) Patent No.: US 8,799,922 B2
(45) Date of Patent: Aug. 5, 2014

(54) PROGRAMMING MODEL FOR COLLABORATIVE DISTRIBUTED SYSTEMS

(75) Inventors: Kaushik Rajan, Bangalore (IN); Shashank Yaduvanshi, Delhi (IN); Sriram Rajamani, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 12/787,149

(22) Filed: May 25, 2010

(65) Prior Publication Data
US 2011/0296432 A1 Dec. 1, 2011

(51) Int. Cl.
*G06F 9/44* (2006.01)
*G06F 7/00* (2006.01)

(52) U.S. Cl.
USPC ............... 719/313; 707/610; 707/690

(58) Field of Classification Search
None
See application file for complete search history.

(56) References Cited

U.S. PATENT DOCUMENTS

| | | | |
|---|---|---|---|
| 5,781,910 A | 7/1998 | Gostanian | |
| 6,012,059 A | 1/2000 | Neimat | |
| 6,823,356 B1 | 11/2004 | Novaes | |
| 6,895,401 B2* | 5/2005 | Skinner et al. | 1/1 |
| 7,290,056 B1 | 10/2007 | McLaughlin et al. | |
| 7,734,820 B1* | 6/2010 | Ranade et al. | 709/246 |
| 7,809,798 B2* | 10/2010 | Chesley et al. | 709/213 |
| 7,870,226 B2* | 1/2011 | Anna et al. | 709/218 |
| 8,103,625 B1* | 1/2012 | Pandit | 707/610 |
| 8,306,947 B2* | 11/2012 | Broeder et al. | 707/610 |
| 2001/0000811 A1* | 5/2001 | May et al. | 709/205 |
| 2002/0129175 A1* | 9/2002 | Banavar et al. | 709/310 |
| 2002/0184239 A1 | 12/2002 | Mosher | |
| 2005/0086384 A1* | 4/2005 | Ernst | 709/248 |
| 2005/0240621 A1* | 10/2005 | Robertson et al. | 707/102 |
| 2008/0208806 A1* | 8/2008 | Dalfo et al. | 707/3 |
| 2009/0217274 A1 | 8/2009 | Corbin | |
| 2009/0254601 A1* | 10/2009 | Moeller et al. | 709/201 |
| 2009/0327817 A1* | 12/2009 | Iyengar et al. | 714/48 |
| 2010/0049718 A1 | 2/2010 | Aronovich | |
| 2010/0106684 A1* | 4/2010 | Pizzo et al. | 707/610 |
| 2010/0125550 A1* | 5/2010 | Imamura et al. | 707/613 |
| 2011/0078123 A1* | 3/2011 | Busch et al. | 707/690 |

OTHER PUBLICATIONS

Carey, et al.; Distributed Concurrency Control Performance: A Study of Algorithms, Distribution, and Replication; Published Date: 1988.
Ellis, et al.; Concurrency control in groupware systems; SIGMOD '89: Proceedings of the 1989 ACM SIGMOD international conference on Management of data; pp. 399-407.

(Continued)

*Primary Examiner* — Charles E Anya
(74) *Attorney, Agent, or Firm* — Steve Wight; Carole Boelitz; Micky Minhas (57) ABSTRACT

Described are methods of providing data sharing between applications. The applications run on different computers, communicate via a network, and share a same distributed object. Each application maintains on its computer an invariant copy of the distributed object and a variant copy of the distributed object. Each application performs update operations to the distributed object, where such an update operation issued by a given one of the applications is performed by: executing the update operation on the variant copy maintained by the given application (i) without the given application waiting for the other applications to perform the operation (each invariant copy is guaranteed to converge to a same state) and (ii) at each of the applications, including the given application, executing the update operation on the corresponding invariant copies.

20 Claims, 6 Drawing Sheets

(56) References Cited

OTHER PUBLICATIONS

Herlihy, et al.; Linearizability: a correctness condition for concurrent objects; Trans. Program. Lang. Syst., 12(3):463{492, 1990.

Kermarrec, et al.; The icecube approach to the reconciliation of divergent replicas; in PODC '01: Proceedings of the twentieth annual ACM symposium on Principles of distributed computing; pp. 210-218.

Lamport; How to Make a Correct Multiprocess Program Execute Correctly on a Multiprocessor; IEEE Trans. Computers, 28(9):690-691; 1979.

Peterson, et al.; Bayou: replicated database services for world-wide applications; In EW 7: Proceedings of the 7th workshop on ACM SIGOPS European workshop, pp. 275-280; 1996 ACM.

Saito, et al.; Optimistic replication; Comput. Surv., 37(1):42-81, 2005.

Satyanarayanan; The evolution of coda; Trans. Comput. Syst., 20(2):85-124, 2002.

Theimer, et al.; Managing update conflicts in bayou, a weakly connected replicated storage system; In SOSP '95: Proceedings of the fifteenth symposium on Operating systems principles pp. 172-182, 1995.

Yu et al.; The costs and limits of availability for replicated services; In SOSP '01: Proceedings of the eighteenth ACM symposium on Operating systems principles, pp. 29-42.

\* cited by examiner

```
1   class Sudoku : GSharedObject {
2       private int[9,9] puzzle;
3       ...
4       private bool Check(int row, int col, int val)
5       {
6               //returns true if adding val at puzzle[row,col]
7               //does not violate the constraints of Sudoku
8               // and false otherwise
9       ...
10      }
11
12      public bool Update(int r, int c, int v)
13      {
14      //adds value to puzzle[r,c] if all constraints
15      // are satisfied
16              if (r > 9 || r <= 0) return false;
17              if (c > 9 || c <= 0) return false;
18              if (v > 9 || v <= 0) return false;
19              if (!Check(r, c, v))
20                      return false;
21              puzzle[r, c] = v;
22              return true;
23      }
24  }
```

```
1 public class UI
2 {
3      enum Color {RED, YELLOW, GREEN, BLUE, COLORLESS};
4      Sudoku s;
5      Color[9,9] colors;
6
7      OnCreate()
8      {
9              //Here is how we create a shared object.
10             string uniqueID;
11             s = (Sudoku) Guesstimate.CreateInstance(typeof(Sudoku),uniqueID);
12             ...
13             //initialize colors array to have all entries be COLORLESS
14             ...
15     }
16     ...
17     void ReDraw(int r, int c, bool res)
18     {
19             //repaint the user interface at row r, column c
20             ...
21     }
22     void OnUpdate(int r, int c, int v)
23     {
24             // the operation we want to do is: s.Update(r,c,v)
25             Operation op = Guesstimate.CreateOperation( s, ``Update", r,c,v);
26             //Issue the shared operation, together with a completion function
27             bool res = Guesstimate.IssueOperation(op,
28                             (bool b) =>
29                                        {if (b) {colors[r,c] = Color.GREEN;}
30                                        else {colors[r,c] = Color.RED;}}
31                                        );
32             if(res){
33                     Colors[r,c]=Color.YELLOW;
34                     ReDraw(r, c, res);
35             }
36     }
37 }
```

PROGRAMMING MODEL FOR COLLABORATIVE DISTRIBUTED SYSTEMS

BACKGROUND

Distributed systems or distributed applications function as a whole yet operate in components on different computers. Components may have local states and may communicate and cooperate by network to form a global state. In particular, different applications on different hosts may share an object such that either may update the object and the object is treated as a single object. In some cases, the distributed components may have some shared global data (e.g., state of the shared object) that each uses by way of a local copy. Programming such distributed systems is difficult for several reasons. When network latency is high, communications between components may be delayed, making it difficult to keep any shared state consistent. Furthermore, logic to maintain concurrency between components, when desired, is inherently difficult to program and when executed may affect global and local performance. Various types of expected failures (nodes, links, disks, etc.) create complications. The desire to maintain consistency between components on various machines may need to be balanced against performance requirements.

There are programming models for collaborative distributed applications, such as where a group of users or clients are collaborating to perform a shared task. With a centralized synchronization model, shared data may be maintained on a central server, but this can affect responsiveness due to latency and contention at the server. On the other hand, caching or replicating shared data locally at each machine may involve non-trivial techniques to keep such replicated shared data consistent. An inherent tradeoff between responsiveness and consistency can be seen with two extremes of each approach. At one extreme, a copy serializability model commits every action on shared data at the same time and once committed such changes are made visible to all machines at the same time. While reliable, copy serializability is inherently slow. At the other extreme, a replicated execution model provides each machine with its own local copy (and only this copy) of the shared data and local copies are updated independently. While performance is high, there is little or no consistency between the states of the various machines.

Discussed below are techniques related to programming models that balance consistency and performance in distributed systems.

SUMMARY

The following summary is included only to introduce some concepts discussed in the Detailed Description below. This summary is not comprehensive and is not intended to delineate the scope of the claimed subject matter, which is set forth by the claims presented at the end.

Described are methods of providing data sharing between applications. The applications run on different computers, communicate via a network, and share a same distributed object. Each application maintains on its computer an invariant copy of the distributed object and a variant copy of the distributed object. Each application performs update operations to the distributed object, where such an update operation issued by a given one of the applications is performed by: executing the update operation on the variant copy maintained by the given application (i) without the given application waiting for the other applications to perform the operation (each invariant copy is guaranteed to converge to a same state) and (ii) at each of the applications, including the given application, executing the update operation on the corresponding invariant copies.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Embodiments described herein relate to programming models for collaborative distributed applications. Such models may permit programmers to find reasonable balance between consistency and performance. Specifically, embodiments may allow each machine in a distributed system to maintain a "guesstimated" or variant copy of the shared state of the system (hence, the term "Guesstimate" will be used to refer to these embodiments). At any point in time, the guesstimated copy in each machine contains the expected outcome of the sequence of operations issued locally by that machine, assuming no conflicts with operations executed by other machines. Eventually, the sequences of operations on all machines converge to the same value or state. However, until this happens, each machine that issues an action or operation on shared global data proceeds (i.e., does not block/wait for remote or local completion) independently using its current guesstimated copy of a shared object. This programming model may allow operations to be executed by any given machine on its guesstimated state without waiting for communication with or action by other machines sharing the same object. In practice, this may be accomplished by having each operation execute multiple times, once at the time of issue when it updates the guesstimated state of the issuing machine, once when the operation is committed (atomically) on all machines, and several times in between as the guesstimated state converges toward the committed state. The results of the executions from issue to commit are not guaranteed to be the same, and constructs may be provided to allow the programmer to deal with such discrepancy.

Furthermore, in embodiments of models described herein, operations may transform shared objects from consistent state to consistent state. Consistency is explicitly specified (i.e., by the programmer) by preconditions on operations. If an issued operation fails its precondition on the local guesstimated state, it is not issued globally and is rejected (providing helpful response times and rapid feedback to permit special handling such as by resubmission). The same operation is executed again at a later time, when the operation is committed atomically on all machines, and the execution is on a different copy of the shared state (which is distinct from the guesstimated state) that is guaranteed to be identical on all machines. For some classes of applications, these two executions of an operation may be expected to produce identical results most of the time, but this is not guaranteed. In particular, an operation could succeed when executed initially on the guesstimated state, and could fail later during commitment on the committed state. Thus, embodiments may allow the programmer to monitor and deal with this discrepancy.

Embodiments of such a programming model are described next. Operational semantics for the programming model will be described. A language extension to C# to use the programming model will then be explained. The programming model will be described in parts with reference to an example multi-player collaborative Sudoku puzzle, which will be addressed first.

Sodoku Example

Figure 1:
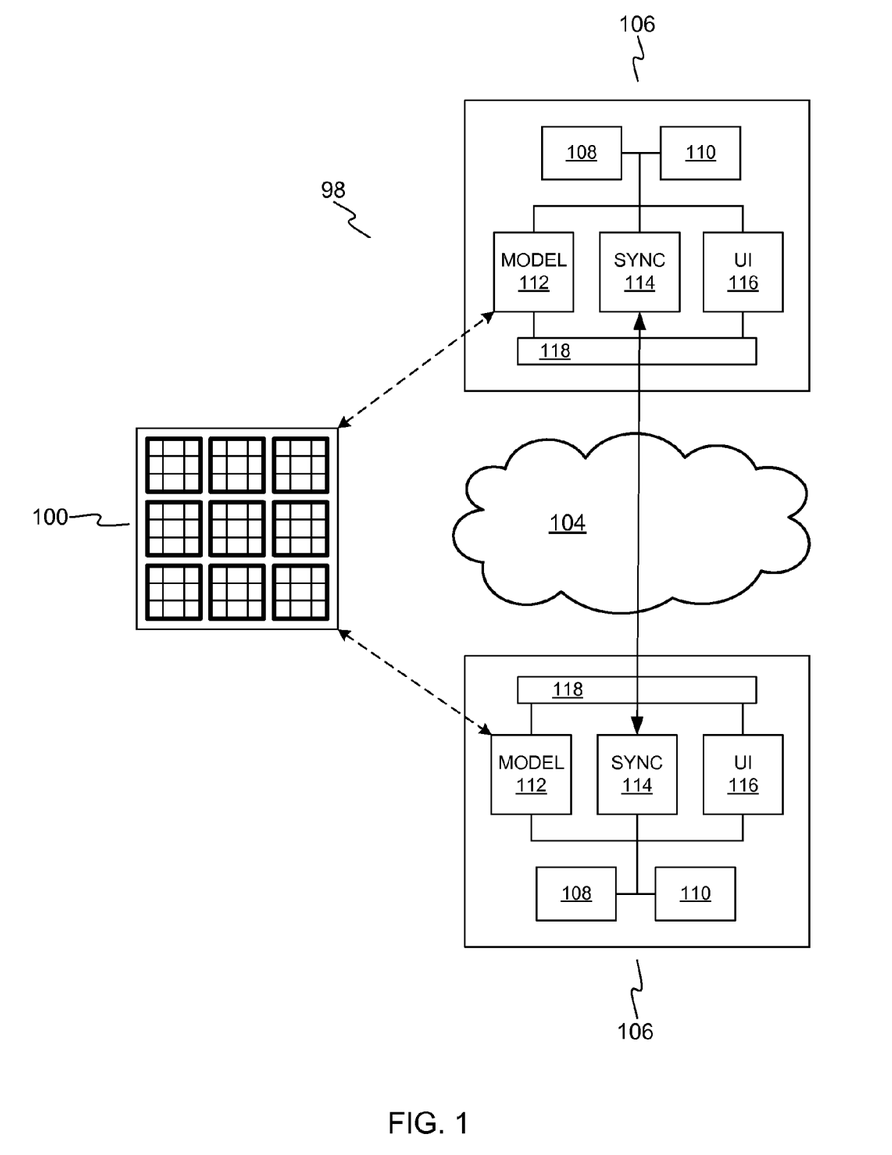
FIG. 1 shows a distributed puzzle application that implements a Sudoku puzzle.

FIG. 1 shows a distributed puzzle application 98 that implements a Sudoku puzzle. By way of background, a Sudoku puzzle is a square 100 (in this case, 9×9), where each box needs to be filled with some integer between 1 and 9. Each instance of the puzzle comes with pre-populated numbers. The objective of the game is to fill all the entries or boxes in the 9×9 square 100 subject to 3 constraints: (1) the same number cannot repeat in a row, (2) the same number cannot repeat in a column, (3) the same number cannot repeat in a 3×3 sub-square.

The distributed application 98 implements a collaborative Sudoku game, where players are distributed across a network 104 (e.g., the Internet). Different players collaboratively work on different portions of the puzzle 100 using an instance of the application running on a respective local computer or machine 106, each using a processor 108 and memory 110 to implement the application 98. The state of the puzzle 100 is replicated locally in each of the machines 106. Programming such an application from the ground up with replicated state is non-trivial. To manage the programming complexity, each machine 106 is provided with a model 112, a synchronizer 114, and a user interface (UI) 116, each implemented by the corresponding local processor 108 and memory 110 in accordance with machine instructions obtainable by implementing embodiments and pseudo-code described herein with known programming tools and techniques. The model 112 maintains the state of the puzzle 100. The UI 116 manages the user interface. The synchronizer 114 performs synchronization between the states of the various machines 106.

The synchronizer 114 is responsible for communication between all the replicated instances of the model on the machine 106 (there may be more than two). Whenever the game's model changes on any machine 106, the corresponding synchronizer 114 needs to propagate changes to all other machines 106. However, synchronization may lead to various conflicts which the application should be able to handle. For instance, there may be a conflict when two updates by two different machines 106 would violate the constraints of Sudoku mentioned above. Or, there could be a race condition when both the UI 116 and the synchronizer 114 try to simultaneously update the model 112 in each machine 106. Programming the application to correctly take these issues into account is difficult. A guesstimate layer or module 118 (also referred to as "Guesstimate") may be provided as infrastructure that implements some of this complexity and that provides a programmer, via an application programming interface (API) with abstract access to sharing/synchronization logic, thus allowing the programmer to focus on expressing the application logic. In other words, the complex logic related to keeping a distributed applications' state synchronized across various machines (described below) is handled by the guesstimate module 118, which is a run-time system that may be made available for use by any arbitrary distributed application. The guesstimate module 118 will be referenced in FIGS. 2 and 3 and elsewhere as the "Guesstimate" namespace, for example, "Guesstimate.CreateOperation()". Implementation of the guesstimate framework or module 118 will be described later.

Figure 2:
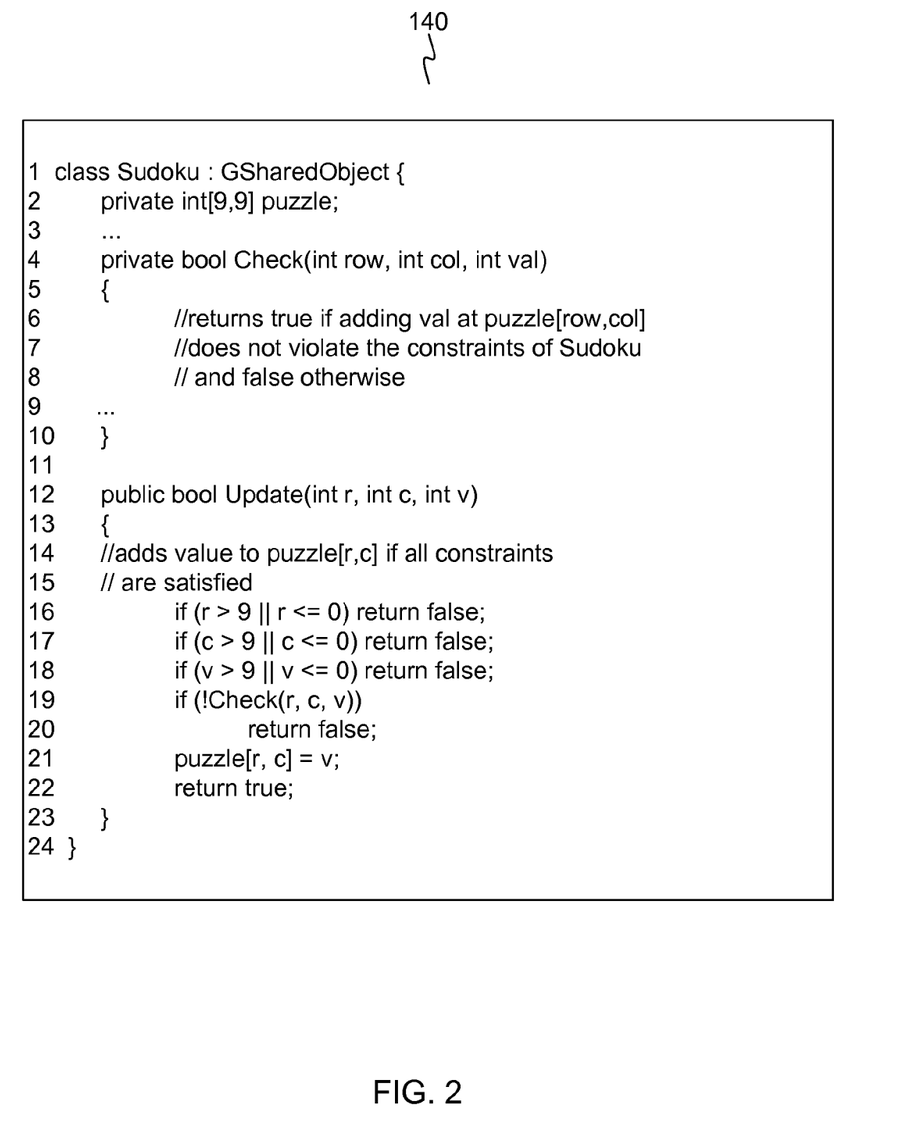
FIG. 2 shows a Sudoku class.

How the guesstimate programming model can be used to program the Sudoku application 98 will be described next. FIG. 2 shows a Sudoku class 140. The Sudoku class 140 implements the model 112, that is to say, the local copy of the state shared by multiple computers. The Sudoku class 140 uses the guesstimate module 118 by declaring shared objects and by deriving from the GSharedObject interface (as shown in FIG. 2). In the Sudoku example, the Sudoku class 140 has a 9×9 array puzzle declared in line 2. The method Check defined in lines 4-10 returns true if upon updating puzzle[row, col] with val the constraints of Sudoku are satisfied. Otherwise, Check returns false. The method Update defined in lines 12-23 updates puzzle[r,c] to value v if the Update is a legal update, and returns true. If the update is not legal, Update returns false. Other than deriving from the interface GSharedObject, the programmer's implementation is much like an implementation for a non-distributed application.

Figure 3:
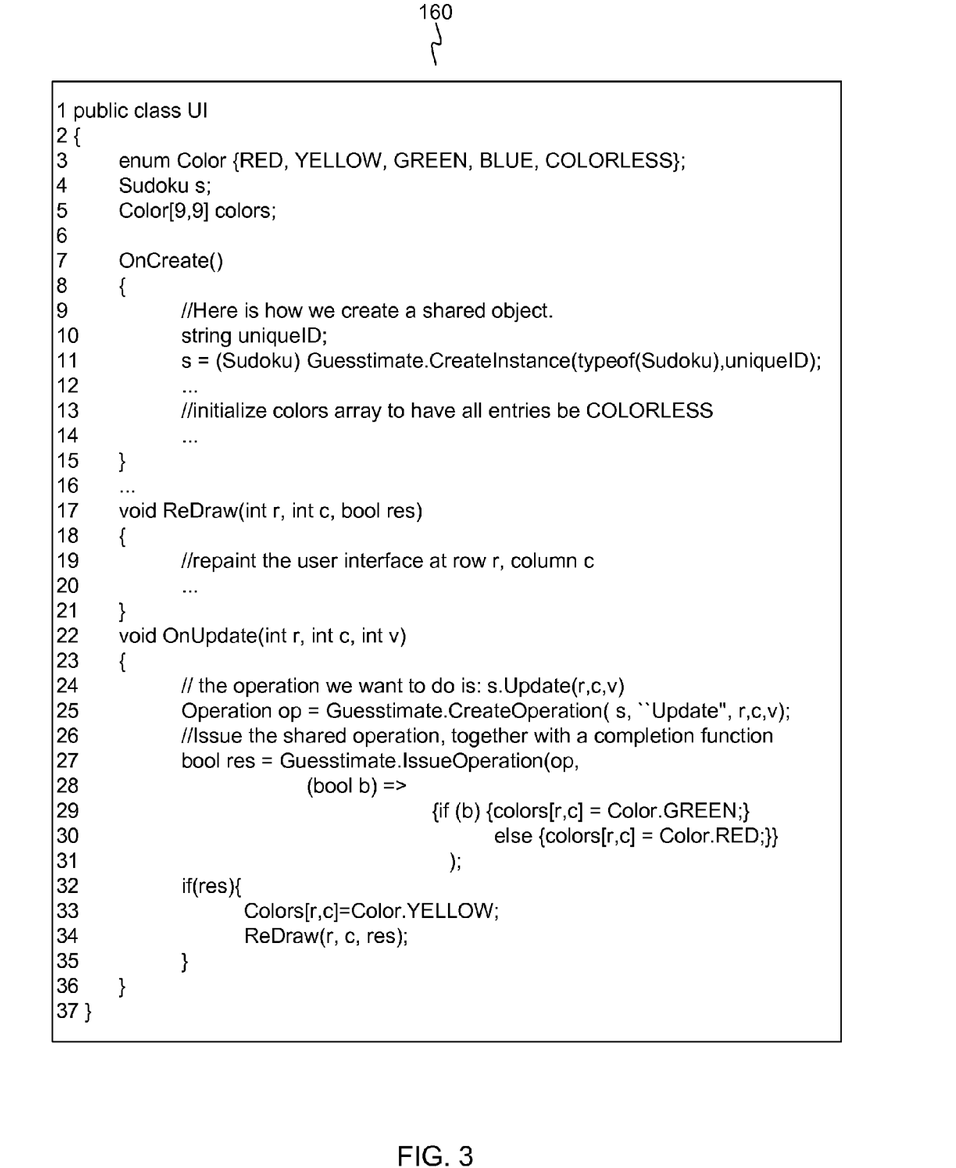
FIG. 3 shows a user interface (UI) class for the example Sudoku application.

FIG. 3 shows a user interface (UI) class 160 for the example Sudoku application. The UI class 160 may implement the UI 116. The UI class 160, at line 11, declares a new instance of the Sudoku class by calling Guesstimate.CreateInstance, which is also implemented by guesstimate module 118. Internally, the guesstimate module 118 creates an instance of the Sudoku class and assigns it a unique identifier. The second parameter to CreateInstance—uniqueID—is an "out" (described below) which gets the value of the unique identifier. Other machines can now share this Sudoku instance by calling the Guesstimate.joinInstance method (described below in the "PROGRAMMING WITH GUESSTIMATE" section)). Machines that have joined this Sudoku instance can now update this object while the guesstimate module 118 takes care of communication and synchronization.

In lines 22-36 of FIG. 3, an event handler is coded to execute in response to an update event of row r, column c with value v. In response to such an update event, in the case of a non-distributed program, this code would simply call s.Update(r,c,v). With use of the guesstimate module 118, the programmer creates a new formal operation using Guesstimate.CreateOperation as seen in line 25, and issues the operation using Guesstimate.IssueOperation as seen in line 27. When the operation is issued, the guesstimate module 118 executes the operation on the guesstimate copy of the Sudoku object. If the execution fails due to violation of any of the constraints of Sudoku (that is, s.Update(r,c,v) returns false), the operation is dropped. Otherwise, the guesstimate module 118 submits the operation internally to a queue, to be committed later simultaneously on all machines (see the "FORMAL MODEL" section for details). The code in lines 32-35 changes the color of the square to yellow if the update succeeded on the guesstimated copy, and calls the Redraw function which repaints the user interface window.

At the time of commitment, the operation s.Update(r,c,v) may succeed or fail. In particular, the operation can fail if, between the time when s.Update(r,c,v) was issued and the time when the operation is committed, some other machines issued other operations that were committed, and these other operations violate the precondition for execution of s.Update(r,c,v).

After commitment, the guesstimate module 118 calls a completion function, which is supplied as a delegate in the last argument of the Guesstimate.IssueOperation (line 27). The completion function takes a boolean value as an argument. The boolean is the result of executing the shared operation (in this case, Update) during commitment. The completion operation is used to change the colors on the UI as follows. If the update operation is successful, the completion operation changes the color of the square at row r, column c to GREEN and if the update fails, the color is set to RED (lines 28-30). The way colors are manipulated by the UI in this example demonstrates how the guesstimate module allows the programmer to deal with changes to the shared state if some operations succeeded initially but failed later due to conflicting intervening operations from other machines.

The guesstimate module 118 also provides a facility to group a set of operations as being "atomic", with the semantics that either all of the operations in the group succeed or none of them succeed, and all of the operations execute together with no other intervening operation. See the "PROGRAMMING WITH GUESSTIMATE" section for additional detail. In sum, programming with Guesstimate may involve the steps shown in FIG. 4.

Figure 4:
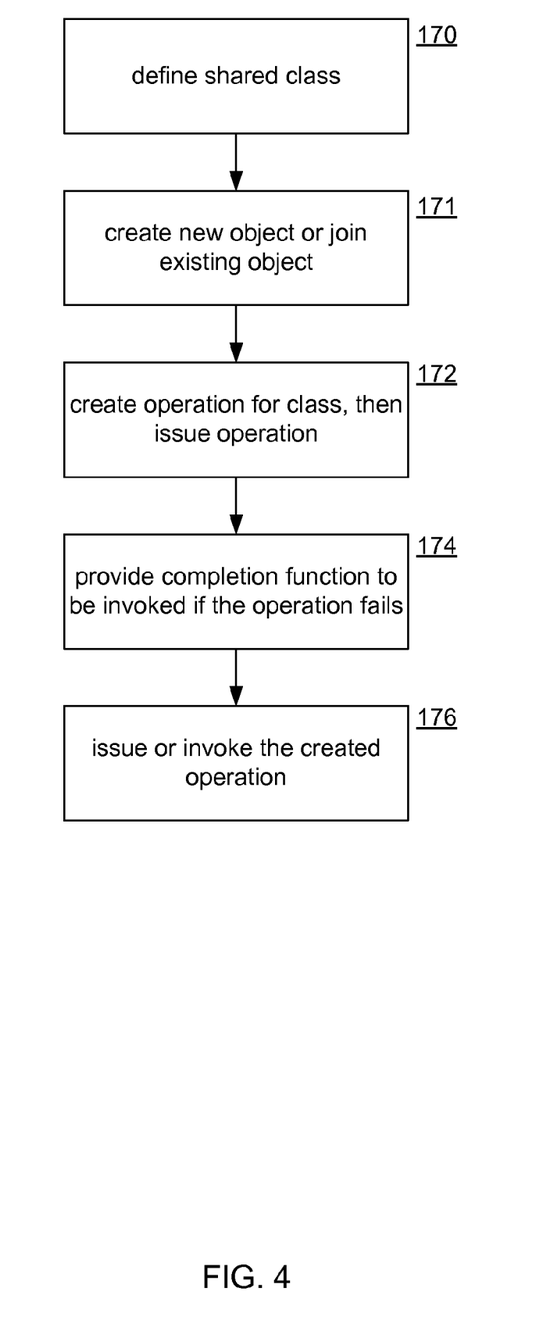
FIG. 4 shows guesstimate programming steps.

FIG. 4 shows guesstimate programming steps. First, a shared class is defined 170. Then a new object is created 171 or an existing object is jointed. Shared classes are classes for objects that the programmer intends to share across multiple machines. The shared class is derived from the GSharedObject interface. When creating shared objects, Guesstimate.CreateInstance or Guesstimate.joinInstance methods are used, which are provided by Guesstimate. Third, an operation on a shared object is created 172 using Guesstimate.CreateOperation. Fourth, a completion is provided 174 to reconcile the client of the shared object in case the operation fails when being committed. Fifth, the operation is issued 174 using Guesstimate.IssueOperation. In practice, the completion may be provided 174 when the operation is created 172 or when the operation is issued 176.

The next section formally describes the Guesstimate programming model and operational semantics.

Formal Model

In this section, the Guesstimate programming model is described formally. A distributed system is a pair <M, 5>, where M is a tuple of |M| machines <$m_1, m_2, \ldots, m_{|M|}$>, and S is a set of shared objects (a machine $m_i$ may represent a computer 106, for example). A shared state is a valuation to the set of shared objects. $\Sigma$ is the set of all shared states. In addition, each machine $m_i \in M$ maintains a local object $L_i$. A local state is a valuation to the local object. $\Gamma$ is the set of all local states.

Each participating machine can modify its local state using local operations that can read the shared state and local state, but can update only local state. A local operation therefore has signature $(\Sigma \times \Gamma) \to \Gamma$. As local operations do not change shared state, they are not applied on other machines. Local operations may be thought of as ways to maintain information regarding submitted operations or ways to query the shared state before applying an operation to change the shared state. The set of all local operations is L.

A shared operation is the only kind of operation that is allowed to both read and update the shared state. Shared operations can succeed or fail. Each shared operation may be thought of as having a pre-condition $\Sigma' \subseteq \Sigma$ and the operation fails if it is attempted to be executed from a state a $\sigma \notin \Sigma'$. For example, if a shared operation tries to buy tickets on an airplane, then it can fail if there are not enough seats available. Thus, in addition to updating the shared state, a shared operation returns a boolean value as well. A shared operation therefore has signature $\Sigma \to (\Sigma \times B)$. The set of all shared operations is S.

A completion operation reads the local state, shared state, and a boolean value, and updates the local state. A completion operation therefore has signature $(\Sigma \times \Gamma \times B) \to \Gamma$. The set of all completion operations is C.

A composite operation o is a pair <s,c> where s∈S is a shared operation and c∈C is a completion operation. Typically, a completion operation is associated with a shared operation, and the boolean value produced by the shared operation is passed as an argument to the corresponding completion operation. The semantics of a composite operation <s,c> can thus be understood as:

$\lambda(\sigma,\gamma).let(\sigma_1,b)=s(\sigma)$ in $let\ \gamma_1 = c(\sigma_1,\gamma,b)$ in $(\sigma_1,\gamma_1)$ To change the shared state, each machine $m_i$ issues a sequence of composite operations ($o_1^i, o_2^i, \ldots$). Given a composite operation o=<s,c> we use the notation [o]—or equivalently [<s,c>]—to denote a function with signature $\Sigma \to \Sigma$ with the following semantics: [<s,c>]=$\lambda\sigma.let(\sigma_1,b)=s(\sigma)$ in $\sigma_1$ The notation [.] is extended to map a sequence of composite operations to function with signature $\Sigma \to \Sigma$ with the semantics:

$[(o_1, o_2, \ldots o_n)] = \lambda\sigma.([o_n]([o_{n-1}] \ldots ([o_2]([o_1](\sigma))) \ldots ))$ Every shared operation executed by a machine $m_i$ (recall that each composite operation has a shared operation) needs to be communicated and executed in each of the other machines $m_j$, where $j \neq i$. To ensure that each of the machines sees the same sequence of shared operations, using Guesstimate, each machine maintains two copies of the shared state, (1) a committed or invariant copy, which is guaranteed to be identical across all machines, and (2) a "guesstimated" or variant copy, which can diverge across machines but is guaranteed to eventually become identical when the system quiesces. When machine $m_i$ issues a composite operation o=<s,c>, the shared operation s executes locally on the guesstimated state without the need for any blocking. If the operation s fails on the guesstimated state, operation o is dropped. If the operation s succeeds, then it is submitted in a "pending" queue associated with machine $m_i$. In the background, a pending composite operation <s,c> is picked from the front of some machine's pending queue, committed, and moved to a "completed" queue. During commitment, the operation s is executed on all machines and the committed state in each machine is updated. During the commitment process, the completion routine c will be run on the machine $m_i$ which issued the operation, and if the operation s fails, then the completion routine c will have the opportunity to take remedial action.

Every time a remote operation commits the guesstimated state on each machine is re-constructed from the committed state on that machine by copying the committed state and applying all operations in the pending queue of the machine, which helps to ensure consistency when the system quiesces. Thus, each machine satisfies the invariant that if all pending operations are executed on the committed state, then the resulting value of the committed state is the same as the guesstimated state. Thus, Guesstimate guarantees that when the system quiesces and the pending queues of all machines are empty, the guesstimated state and the committed state of all the machines converge to the same value.

Formally, the state of a machine $m_i$ is a 5-tuple $<\gamma, C, \sigma_c, P, \sigma_g>$, where $\gamma \in \Gamma$ is the local state at machine $m_i$, C is a sequence of completed shared operations, $\sigma_c \in \Sigma$ is the committed state at machine $m_i$, P is a sequence of pending composite operations at machine $m_i$, and $\sigma_g \in \Sigma$ is the guesstimated state in machine $m_i$ obtained by applying the operator [P] to the state $\sigma_c$. That is, every machine state $<\gamma, C, \sigma_c, P, \sigma_g>$ should satisfy the invariant $[P](\sigma_c) = \sigma_g$.

The set of machine states is denoted by $\Delta$. Given a machine state $\delta = <\gamma, C, \sigma_c, P, \sigma_g> \in \Delta$, call $\gamma$ as Local ($\delta$), C as Completed ($\delta$), $\sigma_c$ as committed($\delta$), P as Pending($\delta$), and $\sigma_g$ as Guesstimate($\delta$). The state of the distributed system is a function $\Pi$ from machine index to $\Delta$, with the invariant that for any pair of machines $m_i$ and $m_j$, Completed($\Pi(i)$)=Completed($\Pi(j)$), Committed($\Pi(i)$)=Committed($\Pi(j)$).

Hierarchical Operations.

A programmer can combine multiple shared operations to form hierarchical operations. A shared operation can have a hierarchical structure as defined in the grammar below:

SharedOp:=PrimitiveOp|AtomicOp|OrElseOp
AtomicOp:=Atomic {SharedOp*}
OrElseOp:=SharedOp OrElse SharedOp An AtomicOp is treated as an indivisible operation with "All or Nothing" semantics. That is, if any one operation were to fail none of the operations that are part of the atomicOp will update the shared state. If all the operations that are part of the atomic succeed then the shared state is updated by all of them. The OrElseOp is a hierarchical operation that allows the programmer to specify an alternate operation in case the main one fails. That is, when the programmer issues ($op_1$ OrElse $op_2$) then at most one of $op_1$ or $op_2$ is allowed to succeed with priority given to $op_1$. The programmer is allowed to arbitrarily nest operations of the 2 kinds.

The next section presents a current programming API in C#.

Programming with Guesstimate

An example implementation of Guesstimate as an extension to C# will be described next. It should be noted that the Guesstimate programming model may be implemented in any language or environment. Programming an existing single machine (non-distributed) version of an application for Guesstimate may involve the following changes.

Any class that defines a shared object will derive from the GSharedObject interface. The interface expects the programmer to define a special Copy(GsharedObject obj) method which when passed a source object should copy the shared state from source to the this object. In addition, the programmer adds features to make the application distributed in nature. These features include creating objects that can be shared by other users, joining objects created by others and applying operations that modify the state of these objects. Guesstimate exposes the following methods to aid the programmer in doing so.

The GSharedObject CreateInstance(Type type, out string uniqueID) method takes the type of the shared object as input and creates a unique object of that type and returns it to the client. The new object along with its unique identifier is registered with Guesstimate.

The List<string, Type> AvailableObjects( )method returns information about all objects in the system. A list of unique identifiers of objects and their types is returned.

The GSharedObject JoinInstance(string uniqueID) method, when passed the uniqueID of an available object, returns a reference to that object. In addition the machine is registered for future synchronizations on the object.

The sharedOp CreateOperation(string id, string method-Name, params object[ ] parameterList) method takes as input the ID of an object, the method name, and the parameters of the method, and returns a sharedOp.

The sharedOp CreateAtomic(List <sharedOp> ops) method takes a list of shared operations as input and returns a hierarchical shared operation.

The sharedOp CreateOrElse(sharedOp op1, sharedOp op2) method takes two shared operations as input and returns a new hierarchical shared operation.

The IssueOperation(sharedOp s, completionOp c) method takes 2 arguments. The first parameter is a sharedOp s created using CreateOperation, CreateAtomic or CreateOrElse. The second parameter is of type completionOp which is a delegate type defined inside Guesstimate with the signature "delegate void CompletionOp(bool v)". Regarding parameter c, the programmer can use this parameter to pass named functions within the program that match this signature or can pass anonymous lambdas as shown above. The IssueOperation method, when passed a composite operation <s,c>, applies s to update the guesstimate state immediately (without waiting for the operation to take effect on other machines). Further, the operation is added to the pending list for committing on all machines. Guesstimate also remembers the machine m that submitted the operation. At the time of commitment the completion operation c is executed on machine m.

Apart from using this API to create shared objects, and issue operations on shared objects, the programmer can choose to implement the application as desired. It should be appreciated that the names of the methods described above (reserved words in the Guesstimate namespace) are only examples to convey the general idea of using a guesstimate copy. In general, any variety of API may be crafted to implement concepts described in the "FORMAL MODEL" section. In other words, the operational semantics in that section are sufficient to construct and use a Guesstimate type of model independent of implementation details. With this in mind, an example runtime Guesstimate will now be described.

The Guesstimate Runtime

Figure 5:
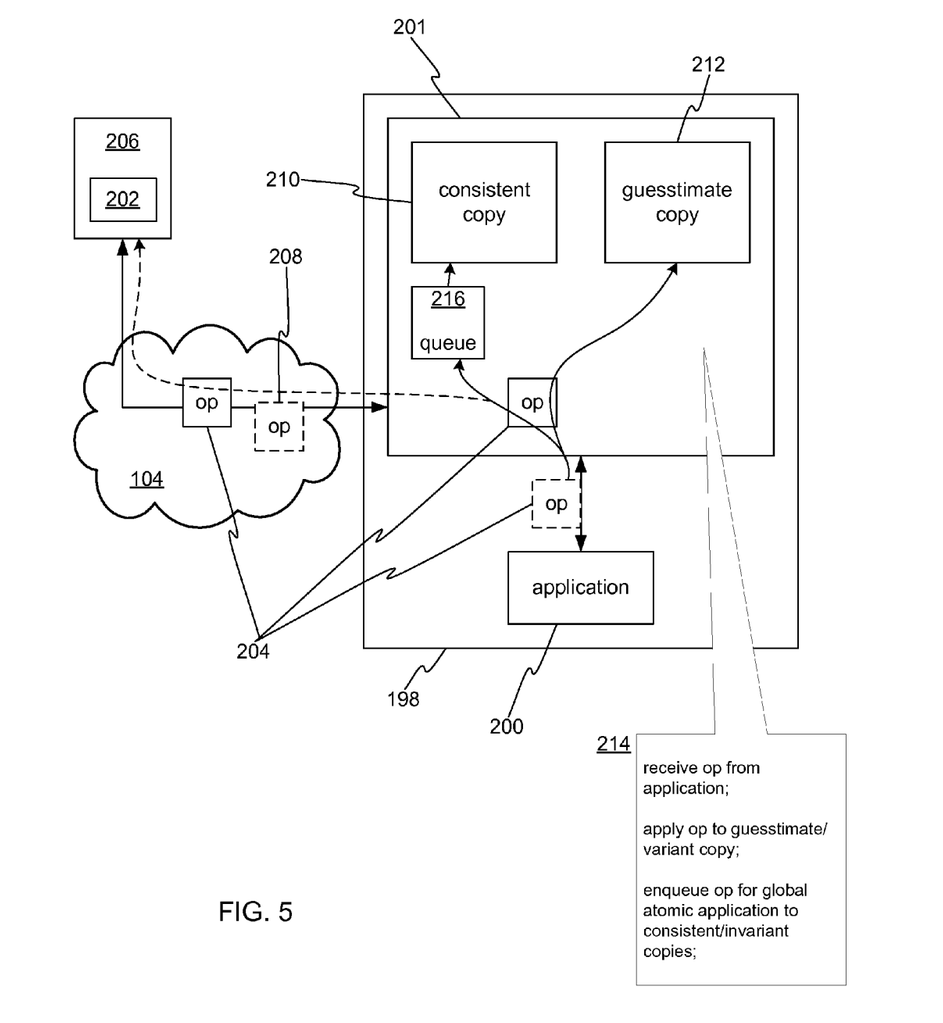
FIG. 5 shows an example machine or computer configured to participate in a distributed application.

FIG. 5 shows an example machine or computer 198 configured to participate in a distributed application. Local application 200 is programmed to use the API discussed above, which is embodied in a runtime module 201, with a role similar to that of module 118 in FIG. 1). The local application 200 is an instance of a distributed application; another instance—remote application 202—executes at remote machine 206, which is configured as machine 198 (the applications need not be copies or instances of the same application to share an object). Application 200 issues operations 204 that are handled by runtime module 201 to update or access shared state data—state of an object shared by the local application 200 and the remote application 202. The shared state is maintained by the runtime module 201 (with a similar module on remote machine 206 not shown). The remote application 202 may also issue operations 208 handled by the runtime modules. As mentioned, the runtime module 201 may maintain state of a shared object (e.g., a shared array of a Sudoku object) transparently to the application 200. The application 200 sees only the shared object, while the runtime module 201 and corresponding remote module cooperate to maintain the state. Runtime module 201 transparently maintains the state by managing a local invariant or consistent copy 210 and a local guesstimate or variant copy 212. The remote runtime module maintains similar copes of state at the remote machine 206. The local runtime module 201 may perform a process 214 of receiving operations issued by application 200, immediately applying the operations to the local variant copy 212 (e.g., updating a local copy of the Sudoku array), and adding the operations to a local queue 214. The remote runtime module and local runtime module 201 apply the operations in their respective queues to the invariant copies of all the machines and if no other operations issue the guesstimate copies 212 will converge to the same state as the committed copies 210.

Figure 6:
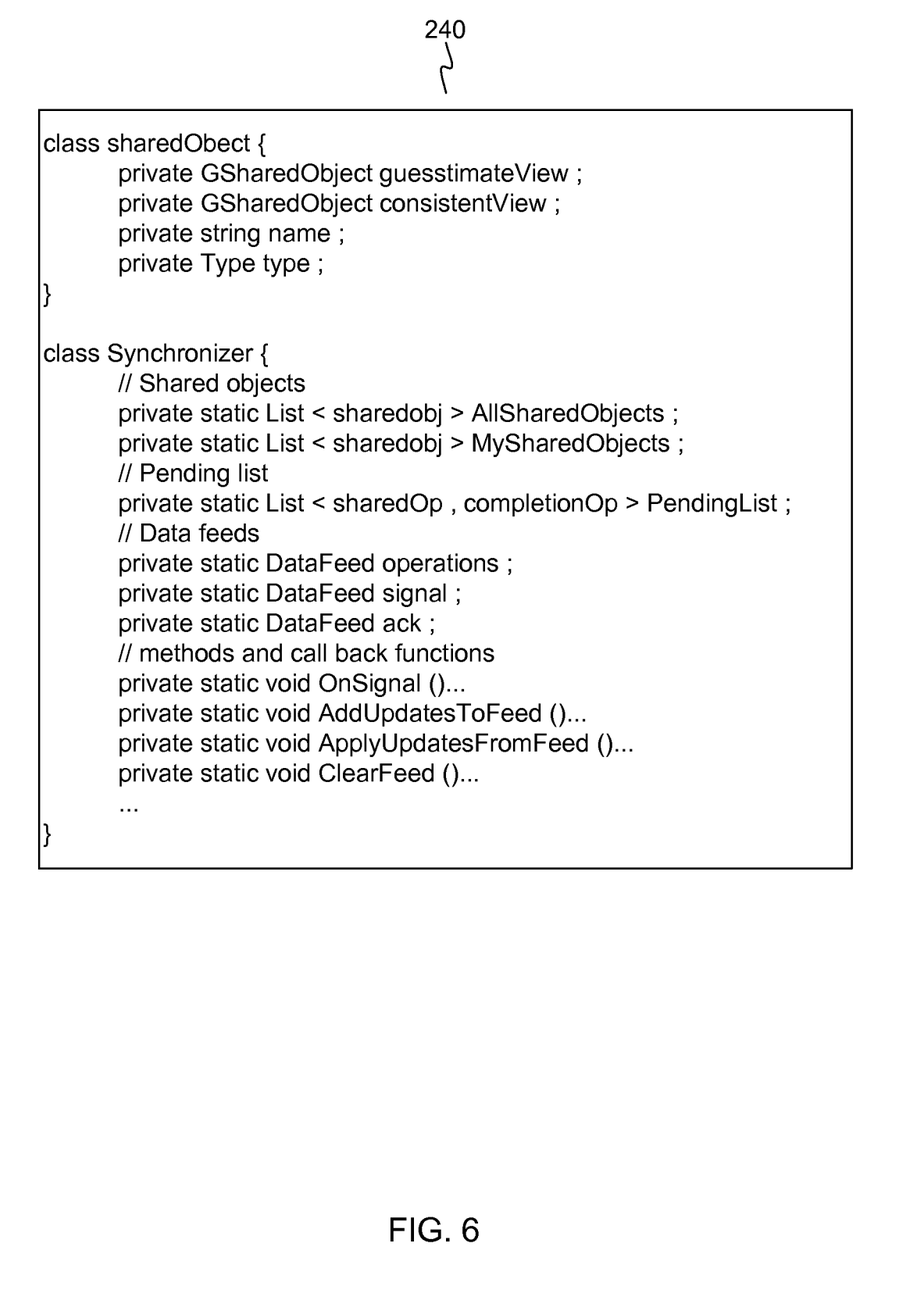
FIG. 6 shows skeleton code of a synchronizer class that may be implemented in a runtime module and instantiated by an application.

FIG. 6 shows skeleton code 240 of a synchronizer class that may be implemented in runtime module 201 and instantiated by application 200. The synchronizer might be used to implement the synchronizer 114 of FIG. 1. The synchronizer component maintains the state needed to coordinate among cooperating machines, for example local machine 106 and remote machine 206, or arbitrary machine i. At each machine i a synchronizer thereon maintains a list of all shared objects in the system (all calls to CreateInstance) and a list of all objects that machine i is subscribed to (calls to JoinInstance made by i). As mentioned above, for each object that machine i is subscribed to, the synchronizer thereon keeps two copies of the object; one copy to maintain the committed state $\sigma_c(i)$, and another to maintain the guesstimated state $\sigma_g(i)$. The synchronize also maintains an ordered list of pending operations $P(i)$ and a list of committed operations $C(i)$. Every operation that is issued by machine i via IssueOperation is added to $P(i)$.

To communicate between machines the synchronizer may use Peer-Channel, a peer-to-peer (P2P) communication technology that is part of .NET 3.5, although any communication means may be used, including simple ad hoc connection management. PeerChannel allows multiple machines to be combined together to form a mesh. Any member of the mesh can broadcast messages to all other members via a channel associated with the mesh (i.e., application level multicasting). The Guesstimate framework uses two such meshes, one for sending control signals and another for passing operations. Both meshes preferably contain all participating machines. Synchronization among the machines is done in a master-slave mode. One of the machines is designated to be the master and is responsible for periodically initiating the synchronization process. The synchronization (i.e. g, the updating of the invariant states) happens over 3 stages, which are as follows.

1. AddUpdatesToMesh. In the first stage the pending operations at each machine are sent to all the other machines to form a consolidated pending list $P_{all}$ at each machine. Starting with the master each machine i, on its turn, sends all operations in $P(i)$ as triples of the form <machineID, operationnumber, operation> via the Operations channel to all the other machines, and then passes the turn to the next machine i+1 via a confirmation message on the Signals channel. The number of operations sent on the Operations channel by machine i is piggy-backed on the confirmation message sent by machine i. As all machines see these confirmation messages and know the number of participating machines, they know the number of operations to expect in $P_{all}$. Once confirmation messages from all the participants are received the master signals the beginning of the second stage.

2. ApplyUpdatesFromMesh. All the machines, in parallel, apply the operations in $P_{all}$. The machines wait until they receive all the expected operations and then apply operations from $P_{all}$ an in lexicographic order of the pair <machineID, operationnumber>. Once an operation has been applied it is moved to the Completed list.

An operation in $P_{all}$ can update the state of machine i in one of two ways. If the operation o=<s, c> were submitted by machine i then o updates ($\sigma_c(i)$, $\gamma(i)$) to the value of o($\sigma_c(i)$, $\gamma(i)$). If the operation were submitted by some machine j≠i then o updates $\sigma_c(i)$ to s($\sigma_c(i)$). Once a machine has applied all operations in all $P_{all}$ it sends an acknowledgment on the Signals channel. After sending the acknowledgment the guesstimate state on i, namely $\sigma_g(i)$ is updated to [P(i)]($\sigma_g(i)$) to reflect the changes made since the synchronization began. This is done by first copying the committed state to the guesstimated state by calling Copy and then applying each operation in [P(i)].

3. FlagCompletion. Once all acknowledgments have been received by the master the synchronization is complete. During these 3 stages the guesstimate runtime may use reflection to transform operations into messages and then back into operations. Reflection is also used to apply a shared operation by calling the appropriate method on a shared object.

It can be shown that there is a simulation relation between the state transitions in the Guesstimate runtime and the rules for operational semantics discussed above. The proof for local operations (corresponding to R1) and issuing composite operations (corresponding to R2) are straightforward. For commitment of operations (corresponding to R3), the crux of the argument is that even though commitment takes several rounds of messages (starting with the master broadcasting operations during AddUpdatesToMesh to the last acknowledgment being received just before FlagCompletion), all composite operations submitted during this duration can be thought of as being submitted either before or after the entire commitment operation completes. In particular, all composite operations issued at machine i before the machine i broadcasts operations (during AddUpdatesToMesh) can be thought of as issued before the atomic commit, and all composite operations issued at machine i after the broadcast by machine i can be thought of as issued after the atomic commit.

Concurrency control will be described next. Within the Guesstimate runtime concurrent updates to shared state are possible. Two kinds of locks are used internally by the Synchronizer to avoid races. Lock $lock_p$ is used to protect the pending list and for each shared object s, $lock_s$ is used to protect the guesstimated state of the object. Lock $lock_p$ is acquired every time an operation is added to the list, every time the list is copied to the mesh and every time the list is used to update the guesstimate state after sending the acknowledgment in ApplyUpdatesFromMesh. The lock $lock_s$ is acquired every time an operation is applied to the guesstimate state of object s and every time the consistent state of object s is copied on to the guesstimate state after synchronization.

Note that all these blocking synchronization operations are used from within the Synchronizer and none involve more than one machine. While the current implementation uses pessimistic concurrency control, lock free implementations and optimistic concurrency control can also have been used. For example, the pending list could be implemented as a lock-free queue. Also if the shared state were large, optimistic concurrency control would be effective as it would allow concurrent independent operations to be applied without blocking.

All or nothing semantics can be provided for atomic operations using copy on write. The first time an object is updated within an atomic operation a temporary copy of its state is made and from then on all updates within the atomic operation are made to this copy. If the atomic operation succeeds, the temporary state is copied back to the shared state.

The Guesstimate runtime can also be provided with logic for adding and removing machines from the distributed system. When an application built with guesstimate is run on a new machine the runtime adds the machine to the Signals and Operations meshes. When a new machine starts up and intimates its presence to the master, the master adds it to the list of devices and sends it both the list of available objects and the list of completed operations. The new device initializes its state based on this information and participates in future synchronizations. A machine that leaves the system intimates the master and the master removes this machine from the next synchronization onward.

Failure and fault tolerance are now discussed. When the master starts a new synchronization phase it assumes all machines are active. However, if the synchronization is stalled for more than a threshold duration, the master goes through the log of messages sent on the signals channel to detect the faulting machine. The master resends the signal to which the machine failed to respond. If the fault was transient the machine might respond to this resent signal. If the machine still does not respond, the master removes the machine from the current synchronization phase and sends it a restart signal. On receiving the restart signal the machine shuts down the current instance of the application and starts it as a new process with the committed state and committed queue from the master, and an empty pending queue. Thus, pending operations in that machine are lost due to the restart. Master failure tolerance can be supported by designating a new machine as master if no synchronization messages are received for a threshold duration.

While a Sudoku example has been shown, other applications such as online real-time auctions, message boards, event planning, etc. may also use the Guesstimate model. Groups of atomic operations may be useful in an event planning application where a user may wish to register for 2 events atomically. For example, a user could decide to go to a party only if there is a car pool available.

Conclusion

Embodiments and features discussed above can be realized in the form of information stored in volatile or non-volatile computer or device readable media. This is deemed to include at least media such as optical storage (e.g., CD-ROM), magnetic media, flash ROM, or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of providing data sharing between applications, the applications running on different computers and communicating via a network, the applications each sharing a distributed object, the method comprising:

maintaining, by each application, on the computers on which the applications are respectively running, respective invariant copies of the distributed object and variant copies of the distributed object, where each application performs update operations to the distributed object, where such an update operation issued by a given one of the applications is performed by:

attempting execution of the update operation on the variant copy maintained by the given application but not on any invariant copies and only applying the update operation to the invariant copies if and when it is determined that the update operation on the variant copy was successful, wherein the update to the variant copy is performed without the given application waiting for the other applications to perform the update operation and without communication with the computers other than the computer executing the given application, where each invariant copy contains expected outcome state of the distributed object due to the update operations of its corresponding computer when those update operations do not conflict with operations executed by the other computers, and the expected outcome state of each invariant copy will converge to identical state of the distributed object when those update operations do not conflict; and if and when it is determined that the update operation on the variant copy was successful, then communicating the update operation to the other computers, and at each of the applications, including the given application that issued the update operation, executing the update operation on the corresponding invariant copies, respectively, wherein the executing the update operating on the corresponding invariant copies does not guarantee that a result thereof will be the same as a result of executing the update operation on the invariant copy of the given computer.

2. A method according to claim 1, wherein the update operation is further performed by providing indicia of a completion operation when issuing the update operation, and executing the completion operation after the update operation has finished executing on each of the applications.

3. A method according to claim 1, wherein over time both the variant and the invariant copies on all computers are guaranteed to converge to a same state of the distributed object.

4. A method according to claim 1, wherein the performing of the update operation on the variant copy of the distributed object is guaranteed to be non-blocking such that after issuing the update operation control returns to the given application continues executing without waiting for the update operation to update the invariant copies.

5. A method according to claim 1, wherein the variant copy of the given application is not consistent with the invariant copy after the update operation is performed on each of the invariant copies including the invariant copy of the given application.

6. A method according to claim 2, wherein a method of the application associated with the update operation is invoked when the update operation fails to update the invariant copies.

7. A method according to claim 1, wherein the invariant copies are guaranteed to reflect identical state of the distributed object after the update operation is attempted to be performed at each of the computers, regardless of whether the updates of the invariant copies succeeded or failed to update any of the invariant copies.

8. One or more computer-readable storage media that is not a signal and that is storing information to enable a computer to perform a process, the process comprising:

executing a distributed computing module and an application on the computer, the distributed computing module comprising a distributed computing application programming interface (API), the distributed computing API comprising:

a shared-object join method that when invoked by the application causes the distributed computing module to register the application with a distributed object specified by the application and to which other applications are registered, where each application issues updates to the distributed object;

a shared-object operation method that when invoked, given an operation specified by the application, causes the distributed computing module to perform the specified operation on a variant copy of a state of the distributed object, where the variant copy is managed by the distributed computing module and is stored on the computer hosting the application, wherein the shared-object operation method returns control to the application without waiting for any communication with any of the other participating machines;

wherein each of the other computers have respective pairs of variant and invariant copies of state of the distributed object, and invocation of the shared-object operation method also causes the operation to be performed on each of the invariant copies only if when determined that the operation on the variant copy was successful, wherein each variant copy is guaranteed to converge to a same state if an update submitted via the shared-object operation method does not conflict with updates of the other computers to their respective variant copies, and wherein when there is a conflict the variant copies are not guaranteed to converge and a conflict is handled by the application where the conflict occurs.

9. One or more computer-readable storage media according to claim 8, wherein the other computers each have an instance of the distributed computing module and the applications thereon use the APIs of their respective distributed computing modules to join and update the distributed object.

10. One or more computer-readable storage media according to claim 8, wherein the API further comprises an atomic operation method that, when invoked with reference to the operation and another operation, causes the operation and the other operation to be performed as a single atomic operation on the distributed object such that both operations must either both succeed or both fail.

11. One or more computer-readable storage media according to claim 8, wherein each of the other computers have respective pairs of variant and invariant copies of state of the distributed object, and invocation of the shared-object operation method also causes the operation to be performed on each of the invariant copies.

12. One or more computer-readable storage media according to claim 8, wherein the API further comprises a shared operation creation method that when invoked by the application with reference to the operation creates a shared operation, and the shared operation is used to invoke the specified operation.

13. One or more computer-readable storage media according to claim 8, wherein a plurality of other applications hosted on other computers respectively, are also registered with the distributed object by way of instances of the distributed application module at the other computers.

14. One or more computer-readable storage media according to claim 13, wherein the API further comprises a shared-object creation method that when invoked by one of the applications running on the other computers creates the distributed object.

15. A first computer comprised of a processor and memory, the processor and memory cooperating to perform a process, the process performed by the first computer comprising:

executing a first instance of a distributed application component, the distributed application component responding to a request from an application to create a shared object by creating a first variant copy of state of the shared object and by creating a first invariant copy of state of the shared object;

receiving, by the first distributed application component, via a network, a request, from a second application running on a second computer, to join the shared object, wherein the second computer executes a second instance of the distributed application component that manages a second variant copy of state of the shared object and a second invariant copy of state of the shared object, and in response allowing the second application to access and update the shared object; and receiving, by the first instance of the distributed application component, a first update operation submitted by the first application, and in response performing the update operation on the first variant copy without communicating with the second computer and without applying the update operation to any invariant copies, and while the first application continues executing receiving by the first application an indication of whether the update operation to the first variant copy was successful, and only if and when the indication is received:

queuing the update operation to be performed both on the first and the second invariant copy, wherein when the update operation is first in the queue and is consequently performed on the first and second invariant copy, if either such update operation fails then the update is not performed on the first and second invariant copy and the failure is handled by the first application.

16. A first computer according to claim 15, wherein the first application specifies to the first distributed application component a completion operation to be associated with the first update operation when the first application issues the first update operation to the first distributed application component.

17. A first computer according to claim 16, wherein when the first distributed application component and the second distributed application component update their respective invariant copies of state of the shared object, the first distributed application component responds by executing the completion operation.

18. A first computer according to claim 17, wherein the first and second distributed application components cooperate to keep the invariant copies synchronized.

19. A first computer according to claim 17, wherein the first and second distributed application components guarantee that the invariant copies are synchronized regardless of the order in which the variant copies are updated and when any pending updates to the shared object issued by the first and second application complete, all of the variant and the invariant copies are guaranteed to contain the same state of the shared object.

20. A first computer according to claim 15, wherein the second application issues another update operation on the shared object and the second application does not block-wait while the first and second distributed application components perform the other update operation.

* * * * *